US007929505B2

(12) United States Patent
Lee et al.

(10) Patent No.: US 7,929,505 B2
(45) Date of Patent: Apr. 19, 2011

(54) APPARATUS AND METHOD FOR TRANSMITTING/RECEIVING DATA IN A WIRELESS LOCAL AREA NETWORK MESH COMMUNICATION SYSTEM (75) Inventors: Sung-Won Lee, Seoul (KR); Jun-Seo Lee, Seoul (KR); Rakesh Taori, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 643 days.

(21) Appl. No.: 11/432,432

(22) Filed: May 12, 2006

(65) Prior Publication Data
US 2006/0268803 A1 Nov. 30, 2006

Related U.S. Application Data (60) Provisional application No. 60/680,534, filed on May 13, 2005.

(30) Foreign Application Priority Data

Apr. 19, 2006 (KR) ........................ 10-2006-0035516

(51) Int. Cl.
 *H04W 4/00* (2009.01)
(52) U.S. Cl. ....................................................... 370/338
(58) Field of Classification Search .................. 370/338, 370/448, 230, 379, 389, 235, 447, 278, 445, 370/352, 310, 334, 332, 441, 325, 311, 254, 370/331, 295.5, 390, 342, 345, 329, 432, 370/465, 507, 510, 503, 328, 358; 455/41.2, 455/552.1, 435.1, 562.1, 63.4, 193.1, 68, 455/69, 404.2
See application file for complete search history.

(56) References Cited

U.S. PATENT DOCUMENTS

| 6,556,582 | B1 | 4/2003 | Redi |
| 6,625,162 | B2 * | 9/2003 | Myojo et al. .................. 370/445 |
| 6,768,730 | B1 | 7/2004 | Whitehill |
| 6,990,116 | B1 * | 1/2006 | Young et al. .................. 370/445 |
| 2006/0211372 | A1 * | 9/2006 | Shellhammer et al. ....... 455/41.2 |
| 2008/0144493 | A1 * | 6/2008 | Yeh ............................... 370/230 |

* cited by examiner

*Primary Examiner* — Melody Mehrpour
(74) *Attorney, Agent, or Firm* — NSIP Law (57) ABSTRACT A method and apparatus are provided for receiving data in a wireless local area network (WLAN) communication system, where a first control signal to check if it is possible to receive data is received, and, when it is possible to receive data, waiting for data and when it is impossible to receive data, transmitting a second control signal representing data reception impossibility. Herein, the second control signal comprises information that enables data transmission when a second control signal is not received during a time interval.

24 Claims, 7 Drawing Sheets

APPARATUS AND METHOD FOR TRANSMITTING/RECEIVING DATA IN A WIRELESS LOCAL AREA NETWORK MESH COMMUNICATION SYSTEM

CROSS-REFERENCE TO RELATED APPLICATIONS

This application claims the benefit under 35 U.S.C. §119 (e) of application Ser. No. 60/680,534 which was filed in the U.S. Patent & Trademark Office on May 13, 2005 and claims the benefit under 35 U.S.C. §119(a) of application Ser. No. 2006-35516 which was filed in the Korean Intellectual Property Office on Apr. 19, 2006, the entire disclosure of both of which are hereby incorporated by reference.

BACKGROUND OF THE INVENTION

1. Field of the Invention

The present invention relates to an apparatus and method for transmitting/receiving data in a wireless local area network (WLAN) mesh communication system. More particularly, the present invention relates to an apparatus and method for reliably transmitting/receiving broadcast/multicast data in a WLAN mesh communication system using a multi-channel.

2. Description of the Related Art

In general, a wireless LAN is different from a conventional wired local area network (wired LAN), in that a wireless LAN (WLAN) uses a wireless medium for data transmission. As such, a wireless LAN does not need a connection cable which is necessary in the conventional wired LAN. The current WLAN uses radio frequencies in order to transmit/receive data so that the WLAN has been highlighted as a network capable of extending or replacing the conventional wired LAN.

The WLAN is based on the Institute of Electrical and Electronics Engineers (IEEE) 802.11 standard. Particularly, among the IEEE 802.11 standard, the standardization of IEEE 802.11s which does not require a cable connection between access points (APs) is actively progressing. A WLAN mesh communication system, which is a WLAN communication system defined in the IEEE 802.11s standard, defines even wireless connection between networks, thereby facilitating the installation of a network even in an area in which it is difficult to install the conventional WLAN.

The WLAN mesh communication system includes a plurality of nodes for transmitting/receiving data. The nodes include a plurality of stations (STAs), a plurality of mesh points (MPs), and a plurality of mesh access points (MAPs). Herein, the MP supports a mesh service, and the MAP refers to a specific MP and provides an AP service for managing the STAs as well as the mesh service.

The structure of the WLAN mesh communication system will now be described with reference to FIG. 1.

Figure 1:
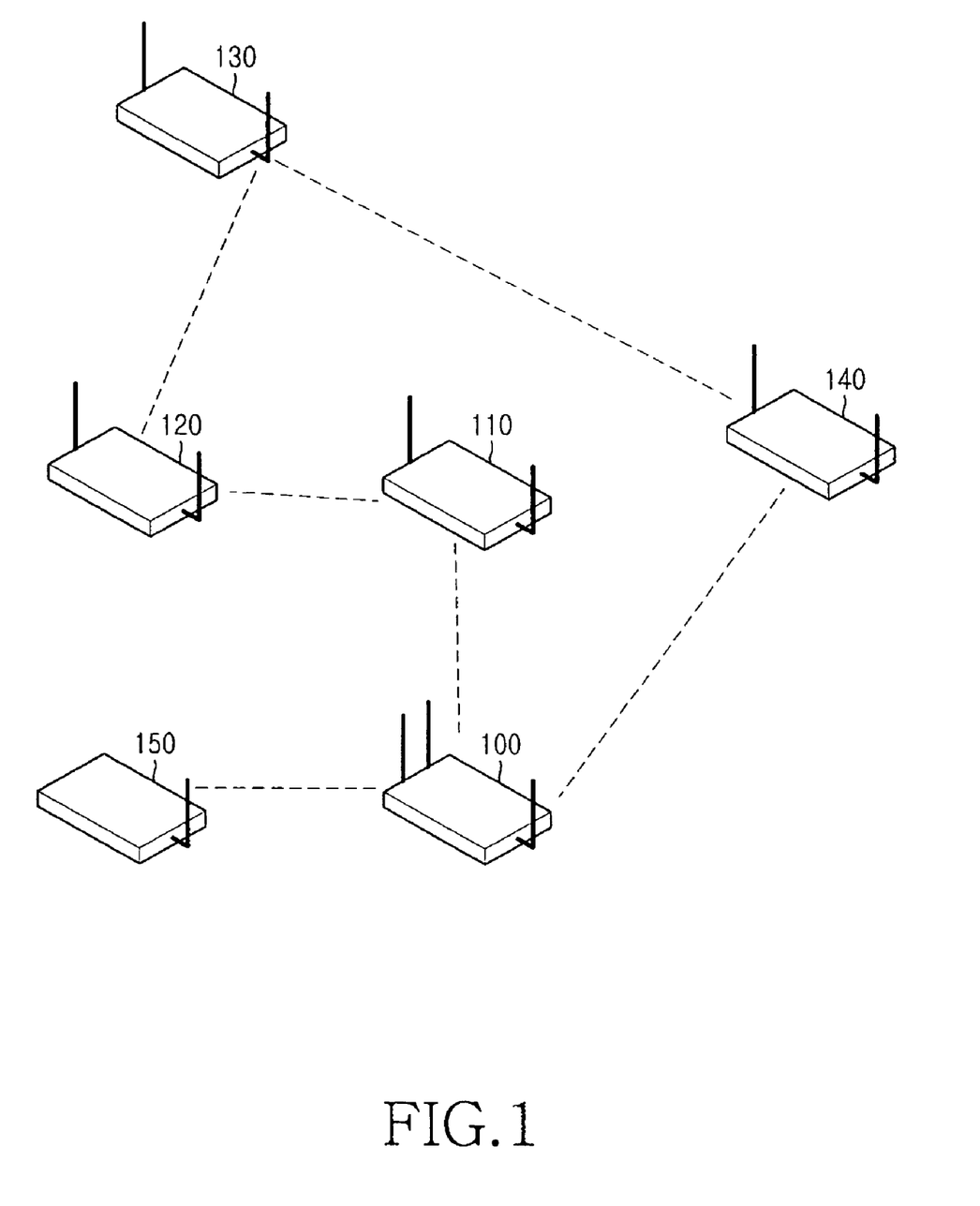
FIG. 1 is a view schematically illustrating the structure of a general WLAN mesh communication system.

FIG. 1 is a view illustrating the structure of a general WLAN mesh communication system.

The WLAN mesh communication system includes a plurality of nodes 100, 110, 120, 130, 140, and 150. Herein, each node 100, 110, 120, 130, 140, or 150 may be an STA, an MP, or an MAP, as described above. However, for example, an STA may exclusively make communication with an MAP. The node 150 and the node 100 may correspond to the STA and MAP, respectively.

That is, the STA 150 can exclusively receive the signals from the MAP 100.

Herein, it is assumed that one transmission node 110 transmits data to predetermined reception nodes 120, 130, 140, and 150. To this end, the transmission node 110 transmits data to the reception nodes 120, 130, 140, and 150 in a multicast scheme. Hereinafter, the operations of the transmission node and reception nodes for transmitting/receiving data based on the multicast scheme will be described with reference to FIG. 2.

Figure 2:
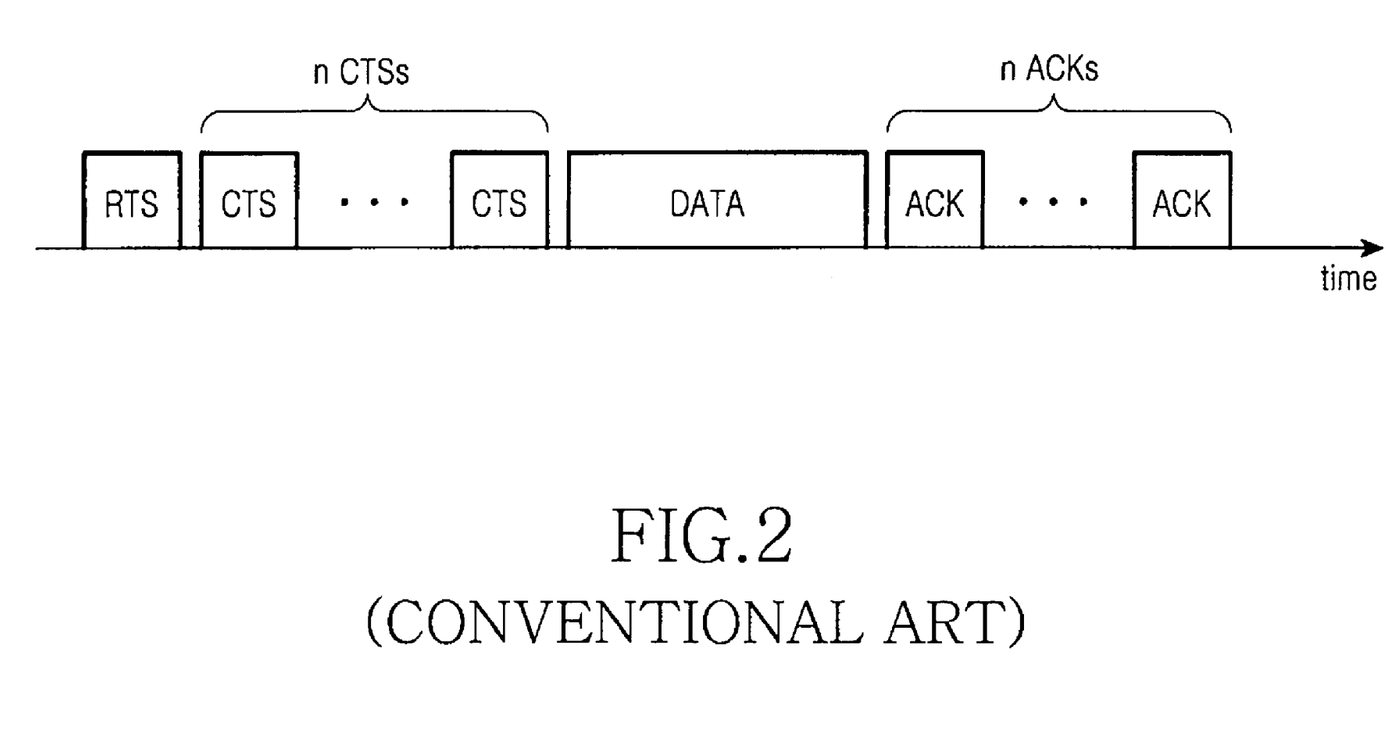
FIG. 2 is a view schematically illustrating a data transmission/reception flow in a general WLAN mesh communication system.

FIG. 2 is a view schematically illustrating a data transmission/reception flow in a general WLAN mesh communication system.

That is, FIG. 2 schematically shows data transmission/reception operations of the transmission node and reception nodes and control signals between the transmission node and reception nodes based on time. Herein, the control signals refer to information transmitted/received between the transmission node and reception nodes in order to transmit/receive data.

Before transmitting data to predetermined reception nodes, the transmission node broadcasts an RTS (Request To Send), checking if the predetermined reception nodes are ready to receive data, to nodes surrounding the transmission node. Herein, the RTS, a CTS (Clear to Send), and an ACK (Acknowledge) are transmitted to achieve reliable data transmission in a broadcast/multicast scheme.

When each predetermined reception node, which is to receive data from the transmission node, receives the RTS, the predetermined reception node determines if it is ready to receive data. When it is determined that the predetermined reception terminal is ready to receive data, the predetermined reception terminal transmits a CTS signal to the transmission node, thereby notifying the transmission node that the predetermined reception terminal is ready to receive data.

Herein, it is assumed that the transmission node is currently transmitting data to reception nodes, and the transmission node desires to transmit data to "n" reception nodes. In the case of using the multicast scheme, the transmission node uses a specific multicast address in order to identify reception nodes. Referring to FIG. 1, for example, a broadcast address is set to "1010" so as to be used for identifying two specific nodes 130 and 140. Also, in the case of using the broadcast scheme, in order to identify reception nodes, the broadcast address is set to "−1" (all bit values are marked with "1" when it is expressed as a binary number), thereby identifying all nodes surrounding the transmission node.

In order to transmit data after transmitting the RTS, the transmission node must receive all "n" CTS signals from the "n" reception nodes. After having received all the "n" CTS signals, the transmission node transmits data to the reception nodes.

In contrast, if the transmission node has not received all the "n" CTS signals, the transmission node re-transmits the RTSs to the reception nodes, and then transmits the data only when having received all the "n" CTS signals.

After having received the data from the transmission node, each reception node transmits an ACK message for representing data reception completion to the transmission node (i.e. MAP), thereby notifying the transmission node that the corresponding reception node has received the data. When the transmission node has received "n" ACK messages because there are "n" reception nodes, data transmission/reception between the transmission node and the reception nodes have been completed.

Meanwhile, in order to transmit data to the reception nodes in a multicast scheme, the transmission node waits for CTS signals after transmitting an RTS. In this case, as the number of reception nodes, to which the transmission node desires to transmit data, increases, that is, as the value of "n" becomes larger, the number of CTS signals to be received by the transmission node increases. Therefore, it is necessary for the transmission node to receive a plurality of CTS signals in order to transmit data to a plurality of reception nodes, thereby wasting resources for data transmission, such as bandwidths, power, and the like.

Meanwhile, when a reception node is not ready to receive data, the reception node cannot send a CTS signal to the transmission node. Therefore, if any one of reception nodes to receive data from the transmission node is not ready to receive data, the transmission node repeatedly performs the RTS transmission procedure. Accordingly, when the transmission node does not receive the CTS signal in the WLAN mesh communication system, the resources are more greatly wasted.

Accordingly, there is a need for an improved apparatus and method for transmitting/receiving data in a wireless local area network mesh communication system.

SUMMARY OF THE INVENTION

Exemplary embodiments of the present invention address the above-mentioned problems and/or disadvantages occurring in the prior art and provide at least the advantages described below. Accordingly, an exemplary object of the present invention is to provide an apparatus and method for transmitting/receiving data in a wireless local area network (WLAN) mesh communication system.

Another exemplary object of the present invention is to provide an apparatus and method for transmitting/receiving data in a multicast scheme in a WLAN mesh communication system.

Still another exemplary object of the present invention is to provide a data transmitting/receiving apparatus and method for a more efficient use of system resources, such as bandwidth and power, in a WLAN mesh communication system.

Still another exemplary object of the present invention is to provide an apparatus and method for transmitting/receiving data through a channel for data transmission, which is obtained through negotiation between a transmission node and a reception node, in a WLAN mesh communication system.

To accomplish these objects, in accordance with one exemplary aspect of the present invention, there is provided a method for receiving data in a wireless local area network (WLAN) communication system, the method comprising: receiving a first control signal to determine if it is possible to receive data, waiting for data when it is possible to receive data, and transmitting a second control signal representing data reception impossibility when it is impossible to receive data, wherein the second control signal comprises information that enables data transmission when a second control signal is not received during a time period.

In accordance with another exemplary aspect of the present invention, there is provided an apparatus for receiving data in a wireless local area network (WLAN) communication system, the apparatus comprising a reception unit for receiving a first control signal to determine if it is possible to receive data, a controller for waiting for data when it is possible to receive data, and for creating a second control signal representing data reception impossibility when it is impossible to receive data, based on the first control signal and a transmission unit for transmitting the second control signal when having received the second control signal from the controller, wherein the second control signal comprises information that enables data transmission when a second control signal is not received during a time period.

In accordance with still another exemplary aspect of the present invention, there is provided a method for transmitting data in a wireless local area network (WLAN) communication system, the method comprising: transmitting first control information to determine if it is possible to transmit data and transmitting data when second control information representing data reception impossibility is not received during a time interval in response to the first control information.

In accordance with still another exemplary aspect of the present invention, there is provided an apparatus for transmitting data in a wireless local area network (WLAN) communication system, the apparatus comprising a controller for creating first control information to determine if it is possible to transmit data, and transmitting data when second control information representing data reception impossibility is not received during a time interval in response to the first control information, a transmission unit for transmitting the first control information and a reception unit for receiving the second control information.

BRIEF DESCRIPTION OF THE DRAWINGS

The above and other objects, features and advantages of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Hereinafter, an exemplary embodiment of the present invention will be described with reference to the accompanying drawings. In the following description of the exemplary embodiments of the present invention, a detailed description of known functions and configurations incorporated herein will be omitted for clarity and conciseness.

An exemplary embodiment of the present invention provides an apparatus and method for transmitting/receiving data in a wireless local area network (WLAN) mesh communication system. Particularly, an exemplary embodiment of the present invention propose an NTS (Not clear To Send) of a reception node as a response to an RTS (Request To Send) of a transmission node in a WLAN mesh communication system which is capable of transmitting/receiving data using a multi-channel. The NTS represents that it is impossible for the reception node to receive data transmitted from the transmission node. Therefore, according to the exemplary apparatus and method of the present invention, the reception node notifies the transmission node of the NTS only, thereby reducing the amount of control signals required for data transmission/reception. In the following description, the exemplary WLAN mesh communication system is based on the Institute of Electrical and Electronics Engineers (IEEE) 802.11s standard.

The exemplary WLAN mesh communication system includes a plurality of nodes, which include a plurality of stations (STAs), a plurality of mesh points (MPs), and a plurality of mesh access points (MAPs). Herein, the MP supports a mesh service, and the MAP refers to a specific MP and provides an AP service as well as the mesh service. Hereinafter, among the nodes, a node for transmitting data will be called a "transmission node", and a node for receiving the data from the transmission node will be called a "reception node". Each of the transmission and reception nodes may be an STA, an MP, or an MAP.

Figure 3A:
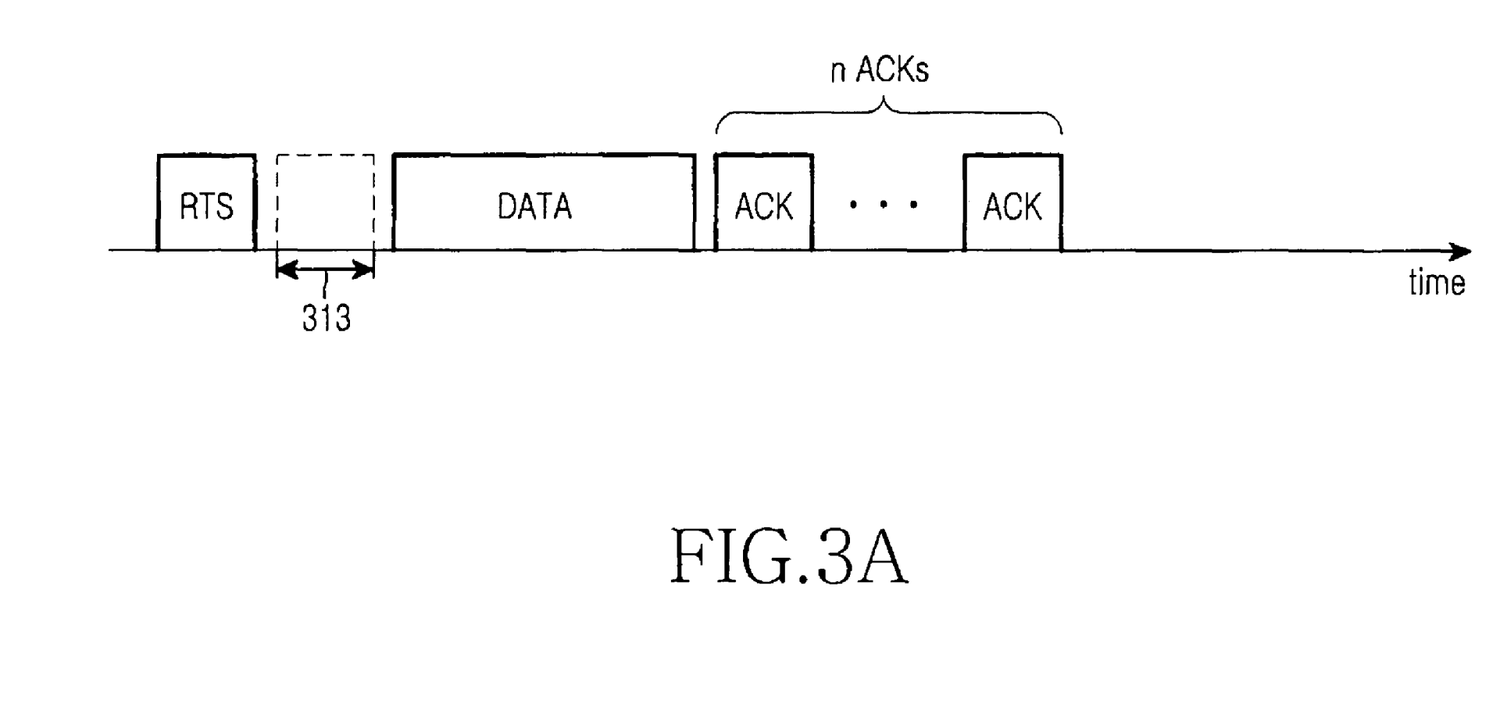
FIGS. 3A and 3B are views schematically illustrating data transmission/reception flows between nodes in a WLAN mesh communication system according to an exemplary embodiment of the present invention.
Figure 3B:
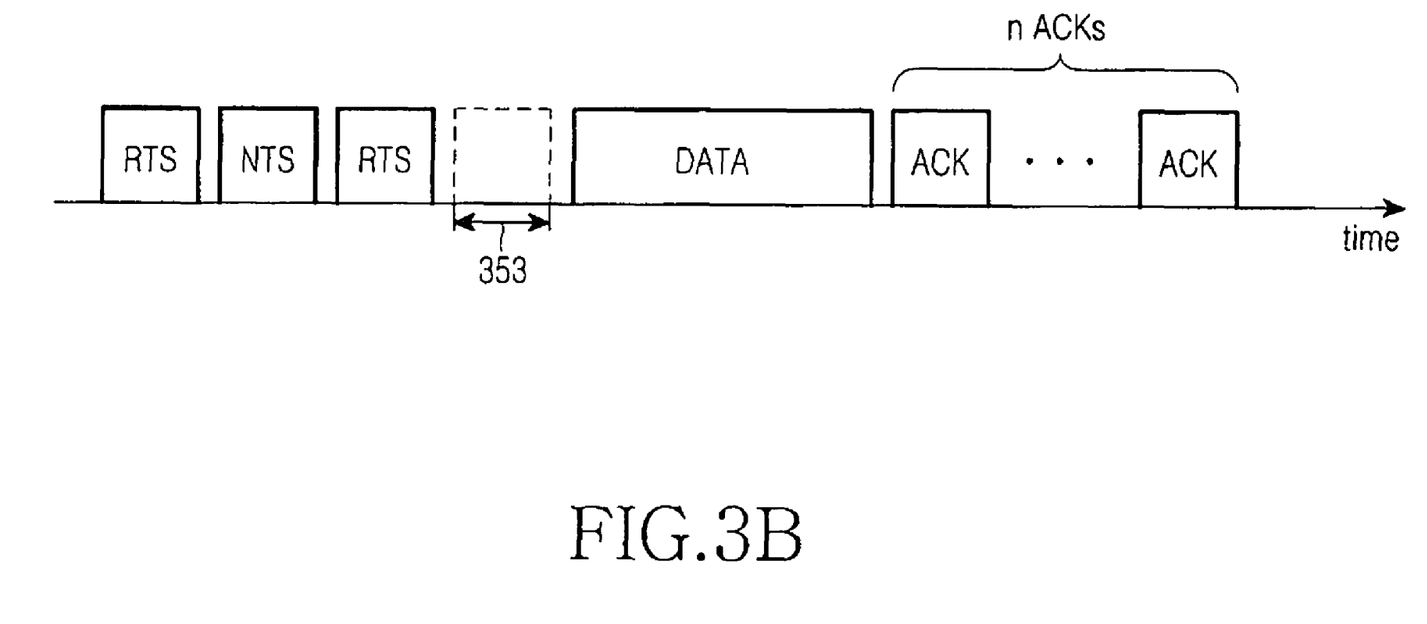

FIGS. 3A and 3B are views schematically illustrating data transmission/reception flows between nodes in a WLAN mesh communication system according to an embodiment of the present invention.

FIG. 3A schematically shows a flow of transmitting/receiving control signals and data between a transmission node and a reception node according to time. The control signals refer to signals for data transmission/reception, and include an RTS, an NTS, and an ACK signal.

The transmission node and reception node transmit/receive the control signals (i.e. RTS, NTS, and ACK signals) through a control channel, and transmit/receive data through a data channel. Herein, the NTS refers to a signal proposed according to an exemplary embodiment of the present invention, and represents that a reception node cannot receive data which are to be transmitted from a transmission node. In addition, it is possible to transmit channel information requesting a change of data transmission channel together with NTS when notifying the transmission node of the NTS.

Therefore, before transmitting data to reception nodes, the transmission node transmits an RTS to nodes surrounding the transmission node, in order to check if the reception nodes are ready to receive the data.

When each reception node, which is to receive the data of the transmission node, receives the RTS from the transmission node, and determines that it is ready to receive the data, the reception node waits for the data without transmitting a CTS (Clear To Send), which has been transmitted in the prior art.

Also, since an exemplary embodiment of the present invention uses a WLAN mesh communication system employing a multi-channel, the transmission node can transmit data through one or more channels, and can transmit data channel information together with the RTS. In this case, after checking if the reception node can receive data through a data channel included in the RTS, the reception node waits for data when it is determined that the reception node can receive data through the data channel.

In order to perform such a procedure, the transmission node transmits an RTS, and then waits for a time interval 313. The time interval may be, for example, a period of time which has been required for the transmission of one CTS signal in the prior art, may have a value which is randomly set or may have a different value.

If the transmission node does not receive any one control signal (i.e. NTS) from the reception nodes during the time interval, for example, during the period of time required for the transmission of one CTS signal, the transmission node transmits the data to the reception nodes. Next, when having normally received the data from the transmission node, each reception node transmits an ACK signal to the transmission node, thereby notifying the transmission node that the reception node has normally received the data.

FIG. 3B shows the operations of the transmission and reception nodes when the transmission node receives an NTS after having transmitted an RTS to a plurality of reception nodes.

Before transmitting data to reception nodes, the transmission node transmits an RTS to nodes surrounding the transmission node, in order to check if the reception nodes are ready to receive the data.

When each reception node, which is to receive the data of the transmission node, receives the RTS from the transmission node, the reception node determines if the reception node itself is ready to receive the data. If a reception node determines that the reception node itself is not ready to receive the data, the reception node transmits an NTS to the transmission node. Then, after having received the NTS, the transmission node re-transmits the RTS.

Herein, it is also possible for the RTS to include data channel information for data transmission. When the data channel information is included in the RTS, each reception node determines if it is ready to receive data through the data channel. When it is determined that it is impossible for the reception node itself to receive data through the data channel included in the RTS, the reception node transmits an NTS to the transmission node. If the reception node desires to change the data channel included in the RTS to a channel desired by the reception node, the reception node can request the transmission node to change the previously-established data channel to a data channel desired by the reception node.

After having received an NTS with channel information, the transmission node changes a channel to transmit data by using the channel information included in the received NTS, and can again transmit the RTS with changed channel information.

When the transmission node does not receive an NTS during a time period 353 after transmitting the RTS, the transmission node determines that the reception nodes can receive data, and transmits data. After having received the data, each reception node transmits an ACK signal to the transmission node.

In addition, the structures of channels for transmitting the control signals (i.e. RTS, CTS, and ACK signals) and data will now be described with reference to FIG. 1.

Exemplary embodiments of the present invention provide an apparatus and method which enables data transmission employing a broadcast/multicast scheme can be reliably performed using a multi-radio/multi-channel.

According to an exemplary embodiment of the present invention, the control signals are transmitted/received through an assigned common control channel. Channels, other than the common control channel, may be used as a data channel. Once a common control channel has been determined by assigning one radio resource, such as a frequency resource, the determined common control channel is not changed thereafter. However, in a specific case, such as when the common control channel cannot be used any more, it is possible to change the common control channel. When the MP or MAP uses at least two radio resources, a channel, which is not used as a control radio, will be called a "data radio". When taking the STA into consideration, at least three radio resources are used by adding one radio resource for making communication between the STA and MAP.

Differently from the control radio, the data radio can be changed from one channel to another channel based on transmitted/received control signals. In this case, although a plurality of nodes are located in one radio range, it is possible to simultaneously transmit data to the nodes.

The reason why the above-mentioned reliable broadcast/multicast data transmission is required is that information about routing is transmitted in the form of a frame, and thus system performance is degraded when the information about routing is lost.

Therefore, according to the exemplary embodiments of the present invention, when broadcast/multicast data are transmitted through a data channel, channel information must be included in an RTS, and the reception node transmits an NTS to the transmission node if the reception node cannot receive data through a channel indicated by channel information included in the RTS. In this case, the RTS and NTS are transmitted/received through a common control channel, and the data and ACK signal are-transmitted/received through a data channel.

Therefore, the first node 100, second node 110, third node 120, fourth node 130, and fifth node 140, shown in FIG. 1, can transmit/receive control signals through one assigned control channel. Herein, in the case of transmitting data, the third node 120 and fourth node 130 use a first data channel in order to transmit/receive data, and the first node 100, second node 110, and fifth node 140 can use the first data channel and a second data channel in order to transmit/receive data. Accordingly, it is possible even in one radio area to transmit/receive data through a plurality of data channels.

Figure 4:
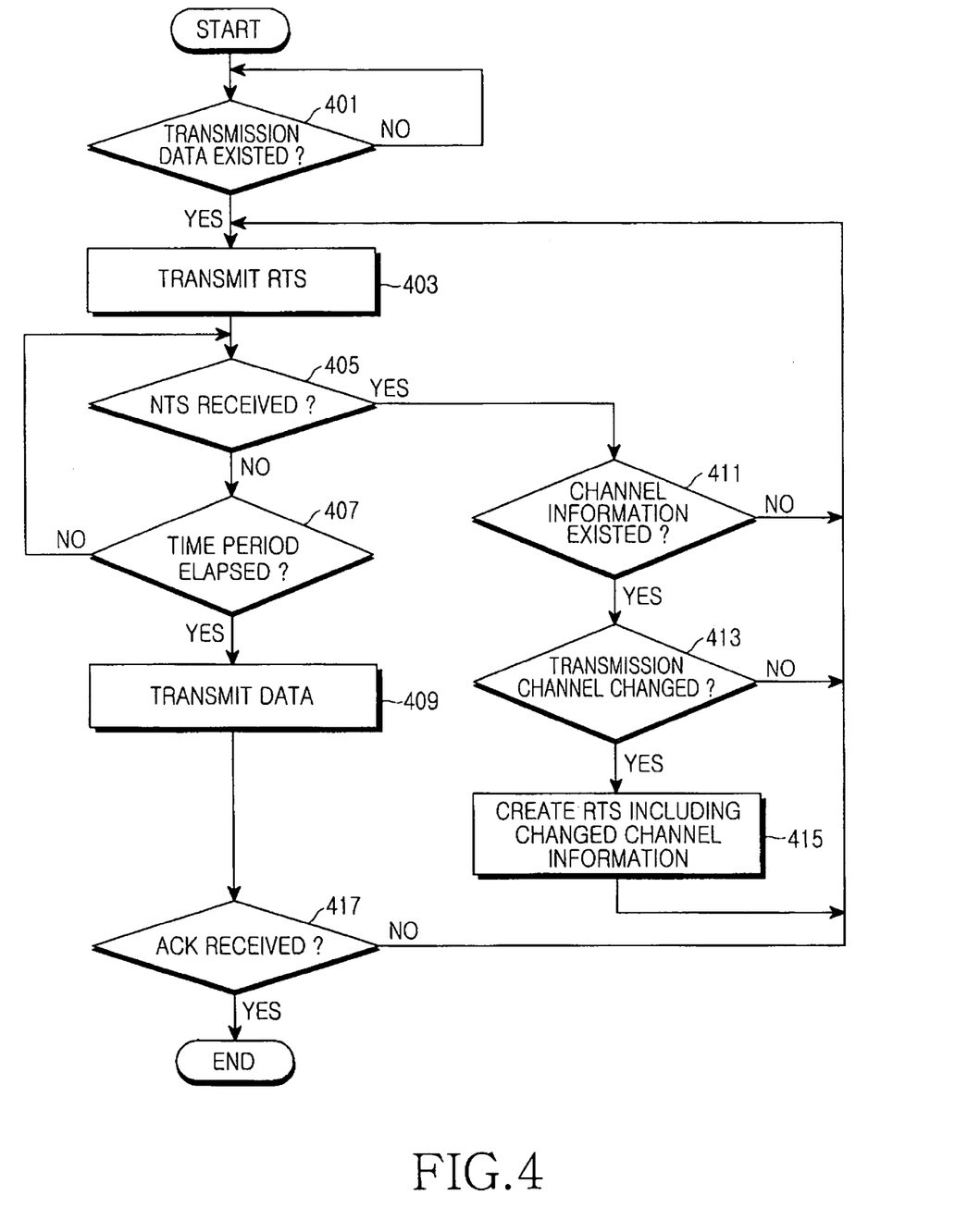
FIG. 4 is a flowchart schematically illustrating the operation of a transmission node in a WLAN mesh communication system according to an exemplary embodiment of the present invention.

FIG. 4 is a flowchart schematically illustrating the operation of a transmission node in a WLAN mesh communication system according to an exemplary embodiment of the present invention.

In step 401, the transmission node checks if data to be transmitted to reception nodes exist. When it is determined as a result of step 401 that data to be transmitted to the reception nodes do not exist, the transmission node enters a waiting state until transmission data are generated while repeating step 401. In contrast, when it is determined as a result of step 401 that data to be transmitted to the reception nodes exist, the transmission node proceeds to step 403.

In step 403, the transmission node transmits an RTS to the reception nodes and then proceeds to step 405. In this case, the transmission node may transmit an RTS used in the prior art, or may determine a channel for data transmission and transmit an RTS including channel information about the channel.

In step 405, the transmission node checks if it receives an NTS from any reception node. When it is determined as a result of step 405 that the transmission node receives an NTS from at least one reception node, the transmission node proceeds to step 411. In contrast, when it is determined as a result of step 405 that the transmission node does not receive an NTS from the reception nodes, the transmission node proceeds to step 407.

In step 411, the transmission node checks if the received NTS includes channel information about a channel, which is established for data reception by the reception node. When it is determined as a result of step 411 that the received NTS does not include channel information about a channel established for data reception by the reception node, the transmission node proceeds to step 403, in which the transmission node again transmits the RTS. In contrast, when it is determined as a result of step 411 that the received NTS includes channel information about a channel established for data reception by the reception node, the transmission node proceeds to step 413.

In step 413, the transmission node determines if it is necessary to change a transmission channel for data transmission. When it is determined as a result of step 413 that it is unnecessary to change the transmission channel to transmit the data, the transmission node returns to step 403. In contrast, when it is determined as a result of step 413 that it is necessary to change the transmission channel to transmit the data, the transmission node proceeds to step 415. In this case, it is possible for the transmission node to change the transmission channel to a different transmission channel requested by a corresponding reception node, with respect to only the corresponding reception node requesting the change of the transmission channel.

In step 415, the transmission node creates an RTS including changed channel information, and returns to step 403.

Meanwhile, in step 407, the transmission node determines if a time interval has elapsed. When it is determined as a result of step 407 that the time interval has not elapsed, the transmission node returns to step 405. In contrast, when it is determined as a result of step 407 that the time interval has elapsed, the transmission node proceeds to step 409.

Herein, the time interval may be established, for example, to be the same period of time as that required for transmitting one CTS signal in the prior art. The time interval may be variably changed and established according to system environment or characteristics.

In step 409, the transmission node transmits data and then proceeds to step 417. In step 417, the transmission node checks if the transmission node has received an ACK signal from each corresponding reception node in response to reception of the data. When it is determined as a result of step 417 that the transmission node has received the ACK signal from each corresponding reception node, the transmission node ends the procedure, but when it is determined that the transmission node has not received an ACK signal from one or more corresponding reception nodes, the transmission node returns to step 403.

Figure 5:
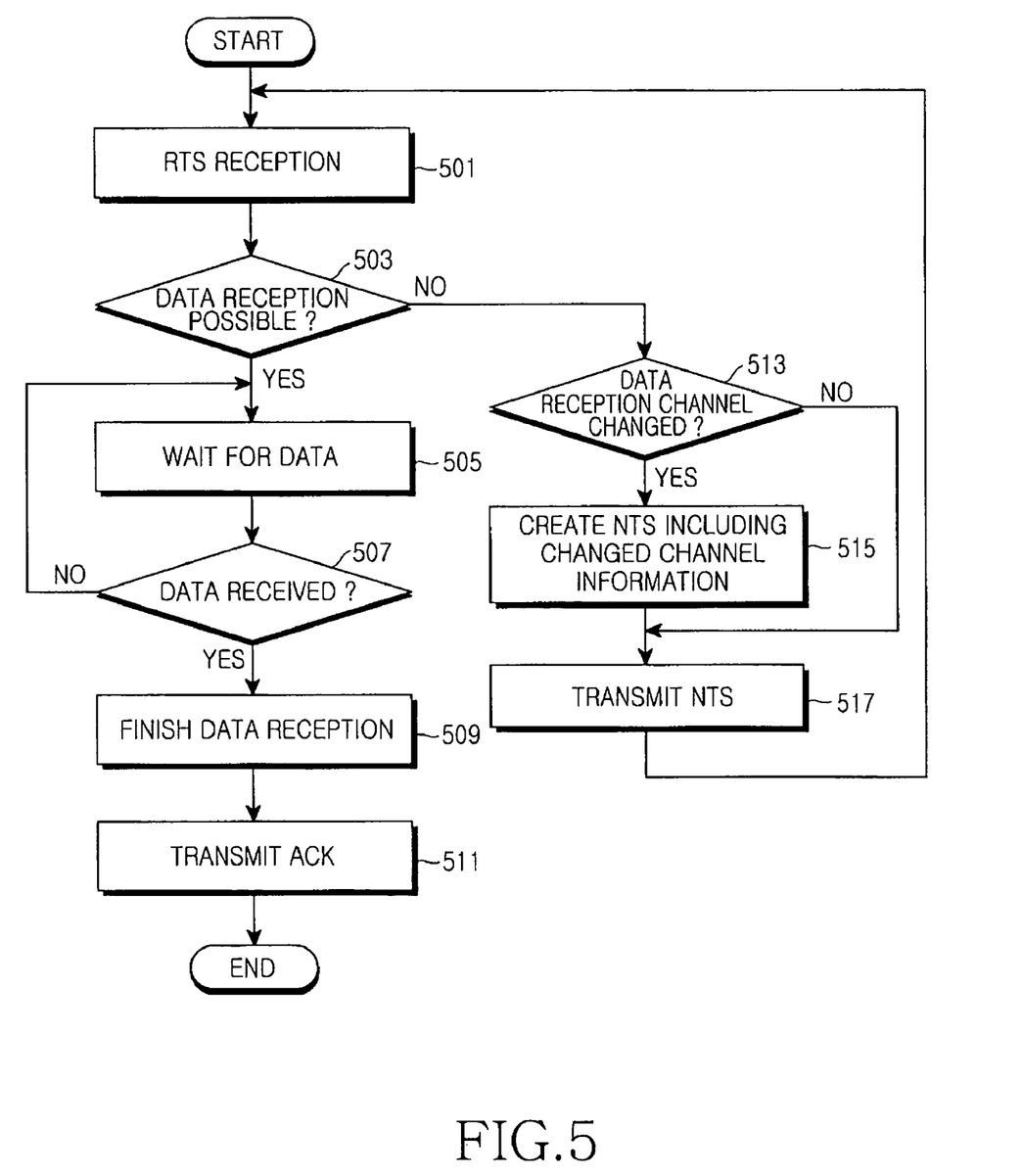
FIG. 5 is a flowchart schematically illustrating the operation of a reception node in a WLAN mesh communication system according to an exemplary embodiment of the present invention.

FIG. 5 is a flowchart schematically illustrating the operation of a reception node in a WLAN mesh communication system according to an exemplary embodiment of the present invention.

In step 501, the reception node receives an RTS and then proceeds to step 503.

In step 503, the reception node determines if it is ready to receive data from a transmission node having transmitted the RTS, that is, if the reception node can receive the data from the transmission node.

When it is determined as a result of step 503 that the reception node can receive the data, the reception node proceeds to step 505. In contrast, when it is determined as a result of step 503 that the reception node cannot receive the data, the reception node proceeds to step 513.

In step 513, the reception node determines if it is necessary to change a data reception channel indicated in the RTS. When it is determined as a result of step 513 that it is unnecessary to change the data reception channel indicated in the received RTS, the reception node proceeds to step 517. In contrast, when it is determined as a result of step 513 that it is necessary to change the data reception channel indicated in the received RTS, the reception node proceeds to step 515.

In step 515, the reception node creates an NTS including channel information about a channel, through which the reception node desires to receive the data, and then proceeds to step 517. In step 517, the reception node transmits an NTS to the transmission node, and then returns to step 501 of waiting for an RTS.

Meanwhile, in step 505, the reception node waits for data of the transmission node, and then proceeds to step 507.

In step 507, the reception node checks if it has received data from the transmission node. When it is determined as a result of step 507 that the reception node has not received data from the transmission node, the reception node returns to step 505 of waiting for data. In contrast, when it is determined as a result of step 507 that the reception node has received data from the transmission node, the reception node proceeds to step 509.

In step 509, the reception node has finished receiving the data, and then proceeds to step 511. In step 511, the reception node transmits an ACK signal to the transmission node, which has transmitted the RTS.

Such operations according to exemplary embodiments of the present invention can be achieved in any WLAN communication system which transmits data in a multicast/broadcast scheme.

Figure 6:
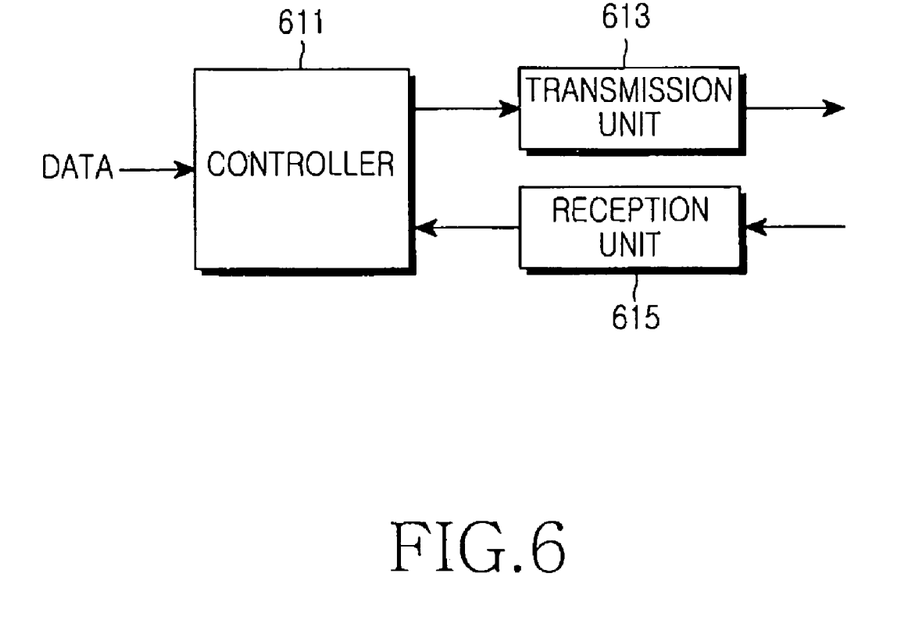
FIG. 6 is a block diagram schematically illustrating the construction of a transmission node in a WLAN mesh communication system according to an exemplary embodiment of the present invention.

FIG. 6 is a block diagram schematically illustrating the construction of a transmission node in a WLAN mesh communication system according to an exemplary embodiment of the present invention.

The transmission node includes a controller 611, a transmission unit 613, and a reception unit 615. When sensing that transmission data are input, the controller 611 creates an RTS in order to check if corresponding reception units can receive the data. In addition, when creating the RTS, the controller 611 can assign a channel to transmit the data. In this case, the controller 611 creates an RTS including information about the channel therein. Then, the controller 611 transmits the created RTS to the transmission unit 613. Next, the transmission unit 613, which has received the RTS, transmits the received RTS.

When not receiving an NTS during a time interval, the controller 611 can transmit the data through the transmission unit 613.

In contrast, the controller 611 may receive an NTS through the reception unit 615, in response to the RTS transmitted through the transmission unit 613. When receiving an NTS, the controller 611 recognizes that the data cannot be transmitted. In addition, the NTS received by the controller 611 may include channel information to request the change of a data channel. Also, the controller 611 can change a data channel. In these cases, the controller 611 re-creates an RTS which includes information about a changed data channel therein. Next, the controller 611 transmits the re-created RTS through the transmission unit 613.

In contrast, when not changing the data channel, the controller 611 again transmits an existing RTS through the transmission unit 613.

Herein, the time interval may be a period of time which has been required for the transmission of one CTS signal in the prior art, or may have a value which is randomly set, as described above. Also, when not changing the data channel, the controller 611 can again transmit a previously-transmitted RTS.

Figure 7:
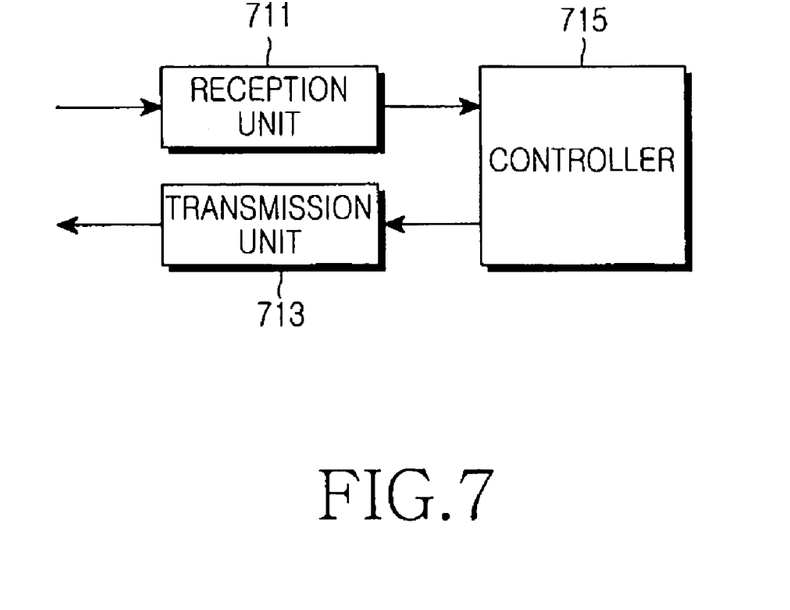
FIG. 7 is a block diagram schematically illustrating the construction of a reception node in a WLAN mesh communication system according to an exemplary embodiment of the present invention.

FIG. 7 is a block diagram schematically illustrating the construction of a reception node in a WLAN mesh communication system according to an exemplary embodiment of the present invention.

The reception node includes a reception unit 711, a transmission unit 713, and a controller 715. When receiving the RTS, the controller 715 determines if the reception node can currently receive data. When it is determined that the reception node cannot currently receive data, the controller 715 creates an NTS notifying the transmission node that data reception is impossible, and transmits the created NTS through the transmission unit 713. In contrast, when it is determined that the reception node can currently receive data, the controller 715 waits for data.

When the received RTS includes information about a data channel to transmit data, the controller 715 determines if the reception node can receive data through the data channel, and then transmits an NTS or waits for data, as described above.

In addition, if the controller 715 determines that it is necessary to transmit the NTS with information about a data channel, through which the reception node is to receive data, the controller 715 creates an NTS including data channel information and then transmits the created NTS through the transmission unit 713.

The transmission node and reception node, as described with reference to FIGS. 6 and 7, operate individually, and include the similar modules (controller, transmission unit, and reception unit), so that the transmission node and reception node can be realized and operated by a single node. In this case, the controller, transmission unit, and reception unit perform the transmitting operation as described with reference to FIG. 6 when the corresponding node functions as a transmission node, and perform the receiving operation as described with reference to FIG. 7 when the corresponding node functions as a reception node.

As described above, according to the exemplary embodiments of the present invention, it is possible to reduce the amount of control signals transmitted/received through a control channel during data communication in a WLAN mesh communication system, which transmits/receives data using a multi-channel. In addition, the present invention improves reliability for data transmission using a multicast/broadcast scheme, thereby improving the performance of the WLAN mesh network.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above exemplary embodiments but by the claims and the full scope of equivalents thereof.

What is claimed is:

1. A method for receiving data in a wireless local area network (WLAN) communication system, the method comprising:
   receiving a first control signal to check if it is possible to receive data;
   waiting for broadcast/multicast data when a corresponding reception node is possible to receive data; and
   transmitting a second control signal representing that data reception is not possible when the corresponding reception node is not possible to receive data;
   wherein a transmission of the broadcast/multicast data is enabled when the second control signal is not transmitted from all of a plurality of reception nodes during a pre-determined time interval.

2. The method as claimed in claim 1, wherein the first control signal comprises a Request To Send (RTS).

3. The method as claimed in claim 1, further comprising determining if it is possible to receive data through a channel when the first control signal comprises information about the channel.

4. The method as claimed in claim 1, further comprising
selecting a channel for receiving the broadcast/multicast data;
wherein the transmitting of the second control signal comprises transmitting information about the selected channel.

5. The method as claimed in claim 1, wherein the pre-determined time interval is substantially identical to a transmission interval for one Clear To Send (CTS).

6. An apparatus for receiving data in a wireless local area network (WLAN) communication system, the apparatus comprising:
a reception unit for receiving a first control signal to check if it is possible to receive data;
a controller for waiting for broadcast/multicast data when a corresponding reception node is possible to receive data, and for creating a second control signal representing that data reception is not possible when the corresponding reception node is not possible to receive data; and
a transmission unit for transmitting the second control signal,
wherein a transmission of the broadcast/multicast data is enabled when the second control signal is not transmitted from all of a plurality of reception nodes during a pre-determined time interval.

7. The apparatus as claimed in claim 6, wherein the first control signal comprises a Request To Send (RTS).

8. The apparatus as claimed in claim 6, wherein the controller determines if it is possible to receive data through a channel when the first control signal comprises information about the channel.

9. The apparatus as claimed in claim 6, wherein a channel for receiving the broadcast/multicast data is selected, and the second control signal comprises information about the selected channel.

10. The apparatus as claimed in claim 6, wherein the pre-determined time interval is substantially identical to a transmission interval for one Clear to Send (CTS).

11. A method for transmitting data in a wireless local area network (WLAN) communication system, the method comprising:
transmitting first control information to check if it is possible to transmit data; and
transmitting broadcast/multicast data when second control information representing that data reception is not possible is not received from all of a plurality of reception nodes during a time interval in response to the first control information.

12. The method as claimed in claim 11, further comprising re-transmitting the first control information when the second control information is received from at least one of the plurality of reception nodes during the time interval.

13. The method as claimed in claim 12, further comprising, when the second control information is received, changing a data channel for data transmission; and
transmitting information representing a change of the data channel with the first control information.

14. The method as claimed in claim 12, further comprising transmitting the first control information, when the second control information includes information representing a change of the data channel, by adding the information representing the change of the data channel to the first control information.

15. The method as claimed in claim 11, wherein the first control information comprises a Request To Send (RTS).

16. The method as claimed in claim 11, wherein the time interval is substantially identical to a transmission interval for one Clear To Send (CTS).

17. An apparatus for transmitting data in a wireless local area network (WLAN) communication system, the apparatus comprising:
a controller for creating first control information to check if it is possible to transmit data, and for transmitting broadcast/multicast data when second control information representing that data reception is not possible is not received from all of a plurality of reception nodes during a time interval in response to the first control information;
a transmission unit for transmitting the first control information; and
a reception unit for receiving the second control information.

18. The apparatus as claimed in claim 17, wherein the controller re-transmits the first control information when the second control information is received from at least one of the plurality of reception nodes during the time interval.

19. The apparatus as claimed in claim 18, wherein the controller changes a data channel for data transmission and creates the first control information comprising information representing a change of the data channel, when receiving the second control information during the time interval.

20. The apparatus as claimed in claim 18, wherein the controller creates the first control information comprising information representing a change of the data channel, when the second control information comprises information representing a change of the data channel.

21. The apparatus as claimed in claim 17, wherein the first control information comprises a Request To Send (RTS).

22. The apparatus as claimed in claim 17, wherein the time interval is substantially identical to a transmission interval for one Clear To Send (CTS).

23. The method as claimed in claim 1, further comprising transmitting an acknowledgement (ACK) signal to denote normal transmission of the broadcast/multicast data.

24. The apparatus as claimed in claim 6, wherein the transmission unit transmits an acknowledgement (ACK) signal to denote normal transmission of the broadcast/multicast data.

* * * * *